United States Patent Office 2,772,302
Patented Nov. 27, 1956

2,772,302

PROCESS FOR THE PRODUCTION OF 11-BROMO-UNDECANOIC ACID

Werner Münch, Cesano Maderno (Milan), Luigi Notarbartolo, Milan, and Levio Spano, Cesano Maderno (Milan), Italy, assignors to Perfogit Societa per Azioni, Milan, Italy No Drawing. Application July 22, 1953,
Serial No. 369,716

Claims priority, application Italy August 7, 1952

4 Claims. (Cl. 260—408)

This invention relates to a process for the manufacture of 11-bromoundecanoic acid.

It is known that undecenoic acid, which is obtained industrially for instance from castor oil, can be brominated by treatment with hydrobromic acid. However the hitherto known processes for the manufacture of 11-bromoundecanoic acid, which can be used for instance to manufacture the corresponding amino-acid from which a useful synthetic linear polymer can be obtained by polymerization, are not wholly satisfactory from the standpoint of their yield and of the purity of the final product. In fact, if the bromination of undecenoic acid is effected by treating the same with anhydrous hydrobromic acid only, there occurs a prevalent formation of 10-bromoundecanoic acid which cannot serve to prepare linear polymers.

In order to obtain mostly 11-bromoundecanoic acid, it is possible to employ hydrobromic acid together with air; however the reaction yield is then unsatisfactory and the reaction product is impure and dark-colored. Both the yield and the purity of the reaction product can be improved significantly by carrying out the reaction in the presence of a peroxide, for instance benzoyl peroxide, or another known peroxide.

It has now been found that both the reaction yield and the purity of the final product can be remarkably improved by operating in the presence of a peroxide but entirely excluding oxygen, that is, by completely displacing the air from the space wherein the reaction occurs with an inert gas like nitrogen or another gas free from oxygen. When thus operating, nearly quantitative yields and a very pure product, practically colorless and transparent, are obtained.

By the use of the invention, the amount of solvent required is also considerably reduced, so that it becomes possible directly to crystallize most of the 11-bromo undecanoic acid from the solution, without any prior distillation of the solvent. It is convenient, even if not wholly necessary, to use a solvent with a moderately reducing character, such as for instance tetralin or cyclohexane or even toluene with a small addition of tetralin or cyclohexane. Naturally the above listed solvents are only examples and may be substituted by other solvents or mixtures of solvents with a moderately reducing character.

The characteristics and advantages of the invention will be made quite clear by the following comparative examples of reactions effected respectively according to the prior art and according to this invention.

All the reactions have been carried out by passing hydrobromic acid into a solution of undecenoic acid in toluene. The consumptions and the yields are referred to 100 grams of undecenoic acid. When the reaction is completed, the solution containing the reaction product is washed to eliminate the excess of hydrobromic acid; the toluene is distilled off and the residue is then crystallized from a suitable solvent which can also be toluene again. The following table shows the results of various reactions numbered from 1 to 5. Reactions from 1 to 3 inclusive were carried out by employing hydrobromic acid in a stream of air; reaction 4 was carried out in the presence of air with the addition of benzoyl peroxide; reaction 5 was carried out in the absence of air and in the presence of 1–2% of benzoyl peroxide, which may be pure but preferably should contain a certain percentage of water. It is seen that the yields of the three reactions of the first group are low unless very high quantities of solvent are employed and in this case the consumption of hydrobromic acid is very high; at any rate, the product has a dark-brown color and contains considerable percentages of 10-bromoundecanoic acid. When benzoyl peroxide is added, the yield rises a little above 80% and a considerable percentage of 10-bromoundecanoic acid is still formed; the amount of solvent required is still high and the color of the product is dark. On the contrary, when working according to this invention (reaction 5) the yield rises above 90%, the solvent consumption is low and the product is practically pure.

| Conditions of the reaction | Reaction No. | grams undecanoic acid | toluene | temperature, degrees | HBr absorbed | Percent of their amount | color of product | impurities (10-Br-undecanoic acid), percent | yield 11-Br-undecanoic acid, percent |
|---|---|---|---|---|---|---|---|---|---|
| In stream of air | 1 | 100 | 1,200 | −5, −3 | 98 | 220 | brown | 8.5 | 79 |
|  | 2 | 100 | 600 | −4, −5 | 100 | 227 | do | 22 | 70 |
|  | 3 | 100 | 100 | 0, +17 | 50 | 114 | do | 8.5 | 38 |
| In presence of air and of benzoyl peroxide. | 4 | 100 | 1,000 | −2, −0 | 50 | 114 | dark | 5 | 81 |
| In absence of air with benzoyl peroxide. | 5 | 100 | 250 | −1, +14 | 65 | 148 | light |  | 92 |

It is evident that the result obtained is wholly unexpected and surprising, all the more surprising in that it was known that the use of hydrobromic acid in the absence of air leads to the prevalent formation of 10-bromoundecanoic acid and it was therefore to be thought that the elimination of air should have been harmful in this respect even in the presence of a peroxide.

It is understood that the details of the described embodiment have been set forth merely by way of example and may be modified without exceeding the scope of the invention, which is essentially characterized in that the reaction is carried out in the presence of a peroxide and in the absence of free oxygen, whereby a surprising improvement in the results of the reaction is achieved.

What we claim is:

1. A process for the preparation of 11-bromo-undecanoic acid, comprising the step of reacting undecenoic acid with hydrobromic acid in the presence of a peroxide and in the absence of free oxygen.

2. A process according to claim 1, wherein the undecenoic acid is reacted in a solution of a solvent having a moderately reducing action.

3. A process according to claim 1, wherein the peroxide is benzoyl peroxide.

4. A process according to claim 1, wherein the air is displaced from the space in which the reaction occurs before starting said reaction by means of a gas free from oxygen.

References Cited in the file of this patent

UNITED STATES PATENTS 2,058,466    Kharasch _____ Oct. 27, 1936

OTHER REFERENCES

Ralston: Fatty Acids and Their Derivatives, 1948, pages 448–449.

Ashton et al.: "Addition of Hydrogen Bromide to Double Bonds Undecanoic Acid." J. Chem. Soc. (1934), part 1, pages 435–440.